(12) United States Patent
Conger et al.

(10) Patent No.: US 7,743,281 B2
(45) Date of Patent: Jun. 22, 2010

(54) DISTRIBUTED FILE FUZZING

(75) Inventors: David J. Conger, Issaquah, WA (US); Kumar Srinivasamurthy, Redmond, WA (US); Robert S. Cooper, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 494 days.

(21) Appl. No.: 11/734,970

(22) Filed: Apr. 13, 2007

(65) Prior Publication Data

US 2008/0256340 A1 Oct. 16, 2008

(51) Int. Cl.
*G06F 11/00* (2006.01)

(52) U.S. Cl. .............................. 714/38; 714/32; 726/25

(58) Field of Classification Search ........................ None
See application file for complete search history.

(56) References Cited

U.S. PATENT DOCUMENTS

| | | | | |
|---|---|---|---|---|
| 5,371,883 A | * | 12/1994 | Gross et al. ................... | 714/38 |
| 5,421,004 A | | 5/1995 | Carpenter et al. .............. | 714/25 |
| 5,729,554 A | * | 3/1998 | Weir et al. ................... | 714/739 |
| 6,513,144 B1 | * | 1/2003 | Kim et al. ...................... | 716/4 |
| 6,980,975 B2 | * | 12/2005 | Reed et al. .................... | 706/47 |
| 6,996,845 B1 | * | 2/2006 | Hurst et al. ................... | 726/25 |
| 7,191,172 B2 | | 3/2007 | McGrath et al. ............... | 707/2 |
| 7,454,659 B1 | | 11/2008 | Gaudette et al. .............. | 714/33 |
| 7,478,365 B2 | * | 1/2009 | West et al. ................... | 717/124 |
| 2002/0010855 A1 | * | 1/2002 | Reshef et al. ............... | 713/164 |
| 2006/0031718 A1 | * | 2/2006 | Thornhill et al. .............. | 714/38 |
| 2007/0006153 A1 | * | 1/2007 | Sultan ......................... | 717/124 |
| 2007/0203973 A1 | * | 8/2007 | Landauer et al. ............ | 709/203 |
| 2008/0077623 A1 | | 3/2008 | Wood et al. .................. | 707/200 |
| 2008/0126869 A1 | | 5/2008 | Kraft et al. ..................... | 714/37 |

OTHER PUBLICATIONS

Sprundel, "Fuzzing", May 30, 2006, [http://events.ccc.de/congress/2005/fahrplan/attachents/683-slides_fuzzing.pdf].*
Harold, "Fuzz testing", Sep. 26, 2006, [http://www.ibm.com/developerworks/java/library/j-fuzztest.html].*
Miller et al. "An Empirical Study of the Reliability of UNIX Utilities", 1989.*
Sprundel, "Fuzzing: Breaking software in an automated fashion", Dec. 8, 2005.*
"Axman", Aug. 2006, [http://www.metasploit.com/users/hdm/tools/axman/demo/, http://www.metasploit.com/users/hdm/tools/axman/].*
"Suru Web Proxy", Oct. 17, 2006 [http://www.sensepost.com/research/suru/documenation.pdf]].*

(Continued)

*Primary Examiner*—Gabriel L Chu
(74) *Attorney, Agent, or Firm*—Merchant & Gould (57) ABSTRACT

Embodiments provide a distributed file fuzzing environment. In an embodiment, a number of computing devices can be used as part of a distributing fuzzing system. Fuzzing operations can be distributed to the number of computing devices and processed accordingly. A group or team can be defined to process particular fuzzing operations that may be best suited to the group. The time required to perform a fuzzing operation can be reduced by distributing the fuzzing work to the number of computing devices. A client can be associated with each computing device and used in conjunction with fuzzing operations.

20 Claims, 10 Drawing Sheets

OTHER PUBLICATIONS

DeMott, "The Evolving Art of Fuzzing", http://www.vdalabs.com/tools/The_Evolving_Art_of_Fuzzing.pdf, Published Date: Jun. 1, 2006, 25 pp.

Banks et al., "SNOOZE: Toward a Stateful Network Protocol Fuzzer:", http://www.cs.ucsb.edu/~rusvika/papers/2006_banks_cova_felmetsger_almeroth_kemmerer_vigna_ISC06.pdf, Published Date: Oct. 4, 2006, 16 pp.

Allen et al., "Model-based Approach to the Security Testing of Network Protocol Implementations", http://ieeexplore.ieee.org/stamp/stamp.jsp?tp=&arnumber=4116693&isnumber=4116490, Published Date: Nov. 14-16, 2006, 8 pp.

* cited by examiner

DISTRIBUTED FILE FUZZING

BACKGROUND

File fuzzing is a process that can be used to test the integrity of a software application. A fuzzer can be provisioned with functionality to add/remove random files, code, data, or other information to/from the software application. The fuzzing results can be analyzed to assess any operating issues or other impact to the functionality of the software application. For example, a fuzzer can be used to ascertain security vulnerabilities associated with a computer program, including protocol and other deficiencies. If an application fails (crashes, fails, code assertions, etc.) during the fuzzing process, there may be certain defects that need to be addressed and corrected.

Unfortunately, a single computing resource is normally used for file fuzzing and the process may take many hours, and sometimes days, to complete, tying up and bogging down the computing resource. Corresponding, the computing resource may not be able to provide results quickly enough (or at all) to be of any value. In some cases, a fuzzing task may be aborted so that an associated resource can be freed-up. Adding to the issue, separate fuzzing outputs are usually reviewed manually, which can occupy many hours of a reviewer's time.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments provide distributed file fuzzing functionality. In an embodiment, a number of computing devices can be used as part of a distributed fuzzing environment. Fuzzing work can be distributed to the number of computing devices and processed accordingly. A group or team can be defined to process particular fuzzing operations that may be best suited to the group. A client can be associated with each computing device and used in conjunction with fuzzing operations.

These and other features and advantage will be apparent from a reading of the following detailed description and a review of the associated drawings. It is to be understood that both the foregoing general description and the following detailed description are explanatory only and are not restrictive of the invention as claimed.

DETAILED DESCRIPTION

Embodiments are provided to distribute file fuzzing operations to a number of computing devices, but are not so limited. In an embodiment, a distributed file fuzzing system is configured to manage aspects of file fuzzing including managing a number of computing devices that are contributing to a number of fuzzing operations. The system includes functionality to: manage file fuzzers; manage fuzzing work and tasks; distribute fuzzing work to a number of computing devices; collect fuzzing results; and/or store fuzzing information to a central repository for investigation and further use.

The distributed file fuzzing system allows fuzzing operations to be distributed to group, teams, or other associations. Accordingly, a group, team, individual, etc. can contribute to an associated fuzzing operation or multiple groups may contribute to one or more fuzzing operations according to a desired fuzzing implementation. For example, one or more computers of a group can each fuzz the same file or each computer can fuzz a different file using a different fuzzer or some combination thereof. Correspondingly, a select number of computing devices can contribute to a number of file fuzzing operations, resulting in an efficient output of fuzzing information that can be used for further analysis and troubleshooting.

Figure 1:
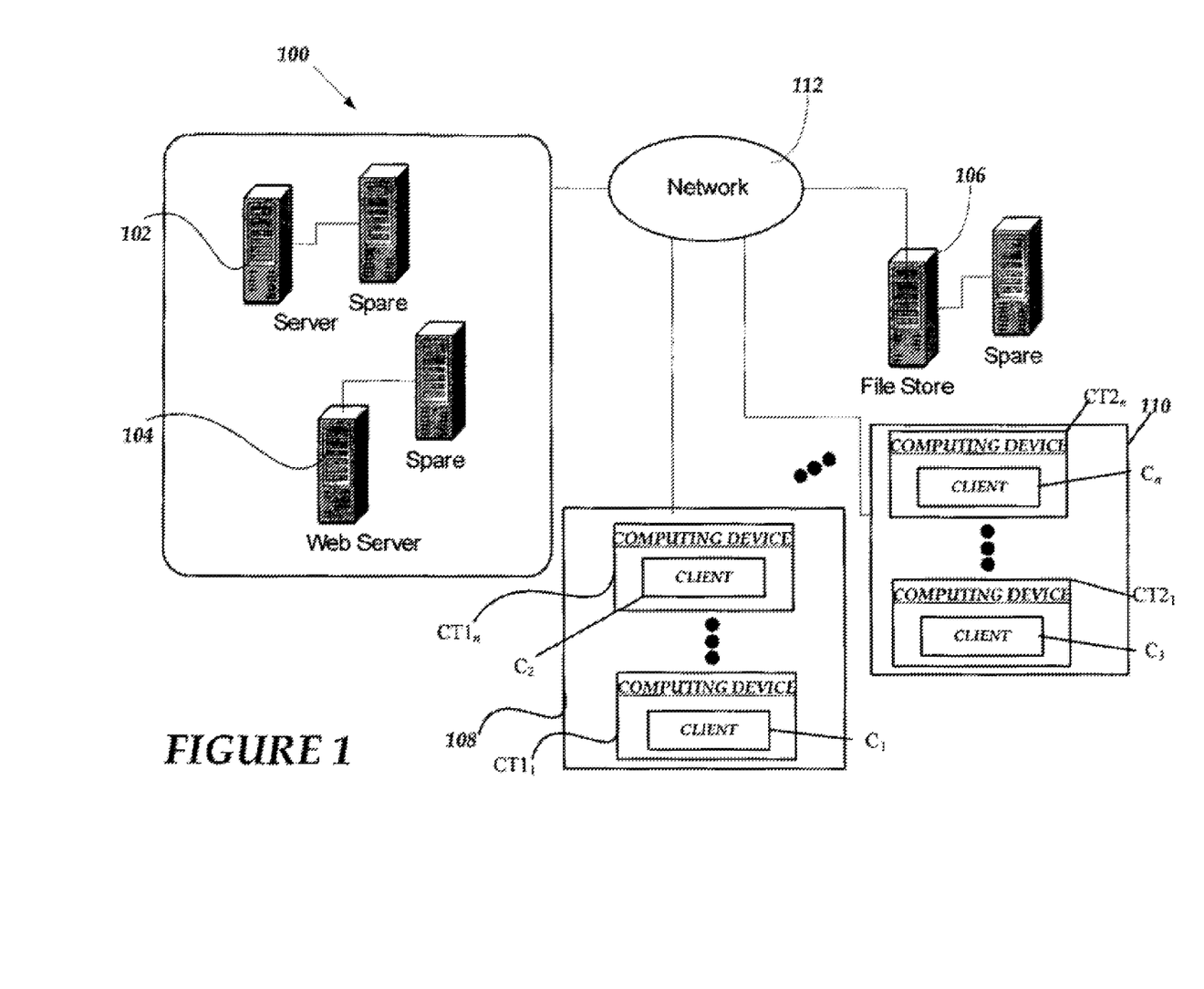
FIG. 1 is a block diagram of a system configured to provide distributed fuzzing operations.

FIG. 1 depicts a system 100 that is configured to provide distributed file fuzzing functionality, under an embodiment. The system 100 is configured to manage fuzzing operations, including managing the distribution of fuzzing work or tasks among a number of computing devices. The system 100 includes networking, security, and/or other communication functionality to provide a distributed fuzzing environment. The system 100 and its components include functionality to communicate with other computing devices, communication devices, and/or other systems and is not intended to be limited to the embodiments and examples described herein.

As shown in FIG. 1, the system 100 includes a server 102, a web server 104, a file store 106, and a number of computing devices (shown in FIG. 1 as computing devices $CT1_1$-$CT1_n$ and computing devices $CT2_1$-$CT2_n$, n being an integer). The server 102 can be configured to provide distributing fuzzing administration, management, and other fuzzing functionality. As described below, the server 102 can be configured to manage fuzzing operations of a number of the computing devices, based in part on the operation of a client that can be associated with a computing device. For example, the server 102 can be configured as a sequel (SQL) server and each client can communicate with the SQL server while participating in distributed fuzzing operations. In one embodiment, server 102, web server 104, the file store 106, and a number of computing devices can communicate information using a web service infrastructure. A spare computing device can be included with the server 102, web server 104, and file store 106. The spares provide a redundant or backup platform if required.

As shown in FIG. 1, the various components are configured to communicate using a network 112, but the system 100 is not so limited. The file store 106 can be configured as a repository for a number of files and other information that can be used to facilitate fuzzing operations. In one embodiment, the file store 106 includes a number of fuzzers, templates, crashed files, unpostprocessed files, and other information that can be used in conjunction with fuzzing operations. When a fuzzing scenario is required, a fuzzer, appropriate fuzzing files, templates, etc. can be communicated (e.g., downloaded) from the file store 106 to an associated computing device, as described below. The server 102 and/or client can be configured to determine an appropriate fuzzer and fuzzer files for an associated computing device.

The fuzzers can include functionality to assess a system, server, application, network, etc. The system 100 can include a plurality of fuzzers, wherein each fuzzer includes an associated fuzzing functionality or capability. For example, fuzzers can be provided with functionality to reverse engineer new and unknown network and file protocols, perform a binary parse of a file; perform bug tests; exploit local and remote vulnerabilities; exploit shared libraries and DLLs, exploit network and web applications; exploit SQL and other code; exploit browser vulnerabilities; etc.

The group 108 of computing devices $CT1_1$-$CT1_n$ can be designated according to a particular function or other association. For example, the group 108 of computing devices $CT1_1$-$CT1_n$ may be part of a particular business unit having a set of goals. Likewise, the group 110 of computing devices $CT2_1$-$CT2_n$ can be designated according to a particular function or other association. For example, the group 110 of computing devices $CT2_1$-$CT2_n$ may be part of a different business unit having a different set of goals. While a certain grouping or association is shown with respect to group 108 and group 110, other groupings and associations are available. For example, the system 100 may use only a single computing device to perform fuzzing work. Accordingly, each computing device can be associated with a particular team or multiple teams and can contribute to fuzzing tasks that are associated with a team or multiple teams.

As described above, a select number of the comparing devices $CT1_1$-$CT1_n$ and $CT2_1$-$CT2_n$ can be outfitted with a client $C_1$-$C_n$. In one embodiment, a client can be included with or provided to an associated computing device that may be contributing to fuzzing work. In another embodiment, a client can be provided to a computing device as needed, such as when a new computing device is added to a group for example. A user can use a client to opt-in and designate the associated computing device to perform fuzzing work. In an embodiment, a number of permissions can be associated with each computing device that are required to be satisfied before contributing to and performing any fuzzing work. In another embodiment, an administrator can designate which of the number of computing devices will contribute to particular fuzzing tasks. For example, it may be efficient to distribute certain fuzzing tasks to computing devices having similar or substantially similar configurations and/or functionality.

As described further below, each client can be configured for use as part of the distribution and management of fuzzing operations. A client can be used as an interlace between a particular computing device and the servers 102 and 104. For example, the client can be configured as a software application (see FIG. 10, fuzzing client 24) that can be used in conjunction with a number of fuzzing operations. In an embodiment, a client can operate to determine an application footprint and other operational parameters of an associated computing device. The client is also configured to communicate with the server 102 and web server 104, as described further below. For example, a client can query the server 102 to determine available files to run, which can then the marked to distinguish that the particular computing device is actively working on certain files so that the same files are not unnecessarily redistributed to other computing devices.

As described above, the server 102 and web server 104 can be configured to manage aspects of fuzzing, distribution, and other system functionality. For example, the server 102 can distribute fuzzing tasks, assess the progress of fuzzing tasks, assess problems associated with fuzzing tasks, and assess and manage other activity associated with the system 100. The web server 104 provides a web-based interface to interact with components of the system 100. For example, a client can use the web server 104 when communicating with the server 102 and/or file store 106.

A user can use a web interface or other user interlace associated with a computing device to interact with the server 102. For example, a user can use a client when determining and quantifying fuzzing work, including defining the associated fuzzing work on the server 102. The server 102 can be polled to determine fuzzing work that needs to be done. Once determined, fuzzing work can be distributed to computing devices of clients that have opted-in to contribute to any fuzzing needs. The fuzzing work can then be distributed to the associated computing devices. After receiving the fuzzing work, each computing device can begin processing fuzzing tasks, and returning results associated with the fuzzing tasks to the server 102 upon completion.

In one embodiment, before contributing to a fuzzing operation, a user can select a team to contribute to, a local deployment location, and/or auto-start options. A user, such as a team contact for example, may have defined a default team for the user when they were added to the system. The team contact can also lock or force a user to a team. If the user is locked, the user will not be able to change the team setting. The local deployment location is a location on the local computing device for storing the associated files with the current run including the file fuzzer, associated files, and templates. Auto-start options include settings to auto-start the client fuzzing process after an amount of time (e.g., X minutes of idle time) and/or on machine lock. The client can also auto-stop on machine unlock or after some amount of time (e.g., X number of hours). A files-per-set setting can be changed according to preference and refers to the number of files to be postprocessed before results are returned to the server 102.

While a certain number of groups or teams and associated computing devices are shown in FIG. 1, the system 100 can be configured to include more or fewer groups and/or computing devices. Also, while each computing device is shown to include a client, other configurations are available. The various components of FIG. 1 can communicate using a network 112, such as the Internet for example, or other communication environment, including wired, wireless, combinations of wired and wireless, and other communication techniques.

Figure 2:
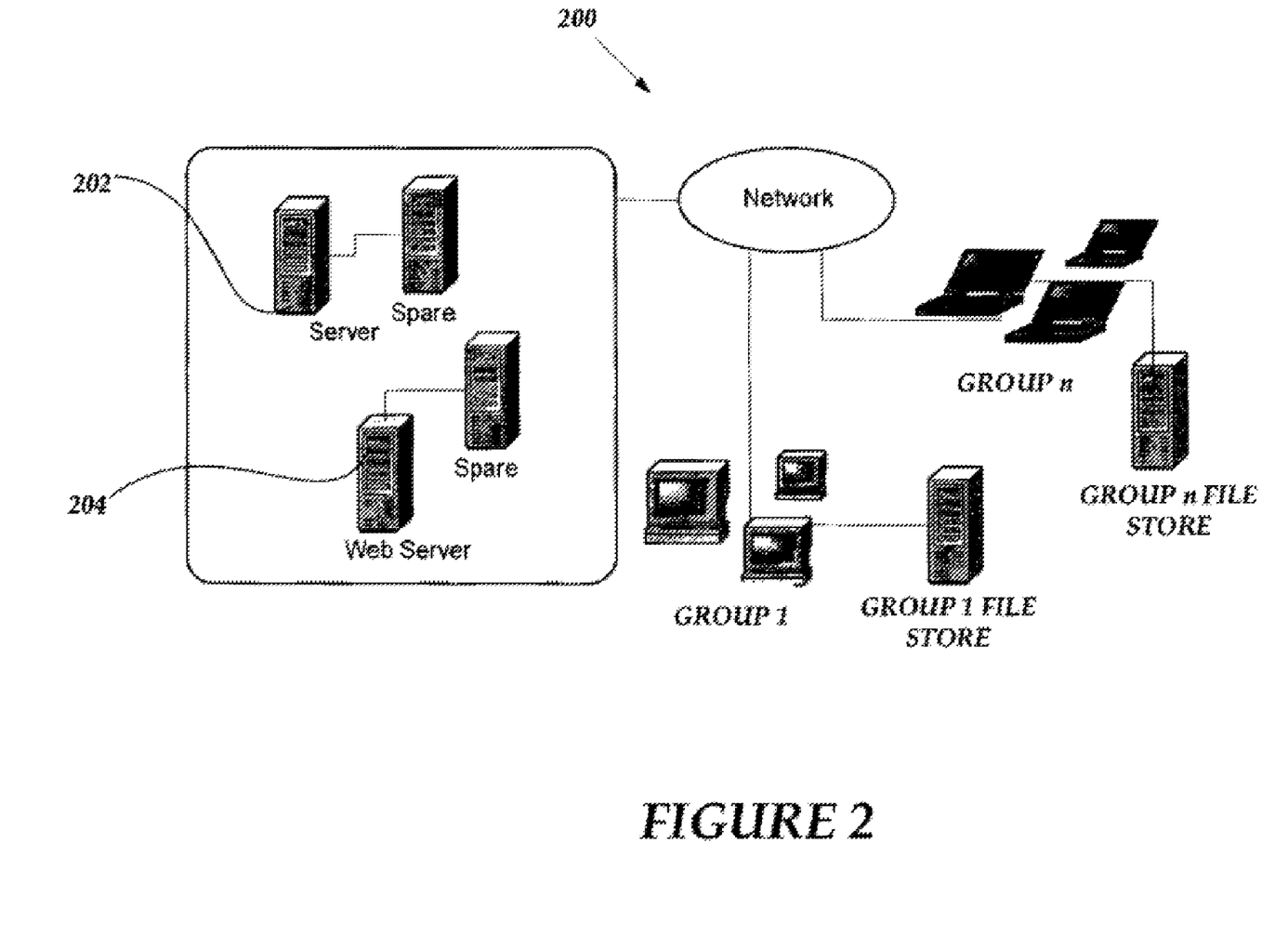
FIG. 2 is a block diagram of a system configured to provide distributed fuzzing operations.

FIG. 2 depicts a system 200 that is configured to provide a computing environment having distributed file fuzzing functionality, in accordance with an embodiment. As shown in FIG. 2, each group of computing devices (group 1 to group n) includes a dedicated and/or co-located file store (group 1 file store to group n file store). In an alternative embodiment, a central file store can be included as part of the system 200 with or without the dedicated file stores.

Figure 3:
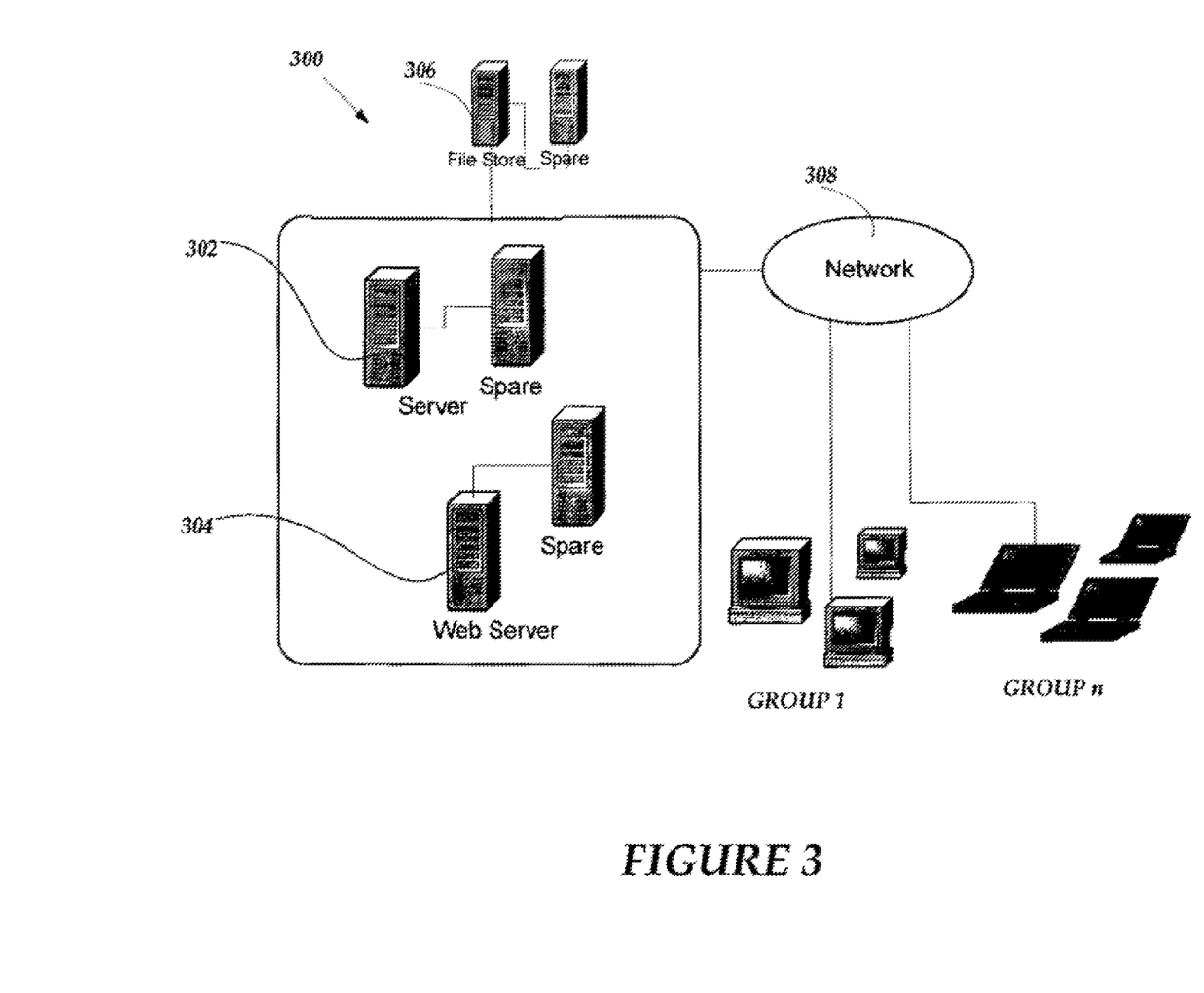
FIG. 3 is a block diagram of a system configured to provide distributed fuzzing operations.

FIG. 3 depicts a system 300 that is configured to provide a computing environment having distributed file fuzzing functionality, in accordance with another embodiment. As shown in FIG. 3, the file store 306 is located on the same side of the network as the server 302 and web server 304. Other distributed fuzzing computing environments are available. For example, a system can include a central file store and one or more local files stores having similar information for redundancy and efficient interaction purposes (e.g., downloading, uploading, etc.).

Figure 4:
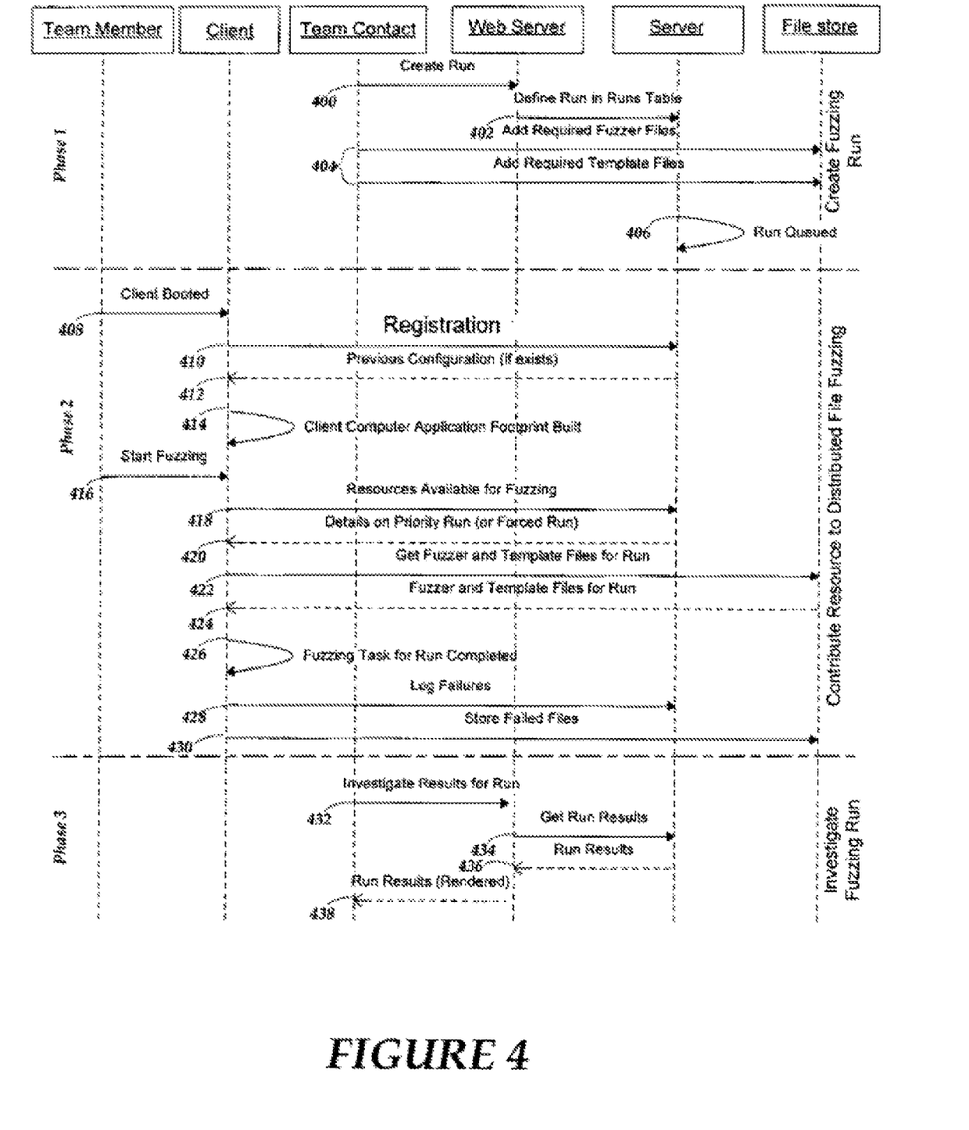
FIG. 4 is a diagram depicting a distributed file fuzzing event sequence.

FIG. 4 is a diagram depicting a distributed the file fuzzing event sequence, under an embodiment. The diagram of FIG. 4 is shown to include a number of phases: phase 1 illustrates a process of creating a fuzzing run; phase 2 illustrates the contribution of a resource to a file fuzzing run; and, phase 3 illustrates the investigation of a file fuzzing run. The components of FIG. 1 will be used in describing FIG. 4, but FIG. 4 is not intended to be limited by FIG. 1.

Phase 1 illustrates the creation of a file fuzzing run. At 400, a team contact or other user can create a run by defining a number of run parameters. For example, a user may define an application to be fuzzed including a particular fuzzer and a number of fuzzing templates for use in the application fuzzing. Information used to create a run can include, but is not limited to: a fuzzing group or team; identification (ID) of any associated computing device; application type extension (of the file type that will be fuzzed); name; owner; build number to run against (with operator); total iterations to be completed; maximum number of failures; maximum number of computers to use; operating system to run against; fuzzer timeout; fuzzer type; a set of templates; etc.

A version number can be specified with an operator to restrict computing devices from a run that do not meet a defined version specification. For example, ">12.0.0.0" could be defined which would mean that only computing devices with a version greater than 12.0.0.0 of the defined application would be able to contribute to a run. The maximum number of failures will cause the run to be marked as complete when a certain number of failures are found during the run. The fuzzer timeout is a combination of the timeout as defined in the associated fuzzer and the amount of computing memory used. Correspondingly, a file fuzzer can be throttled or otherwise controlled based in part on the configuration of an associated computing device. The timeout in the file fuzzer can be used to define how long the fuzzer will wait before killing the application process and moving to the next file.

In one embodiment, a fuzzer can be defined from a predefined fuzzer, copied from another run specification, or a public directory path may be specified for a fuzzer (e.g., a path to a desired file fuzzer). For example, if a predefined fuzzer is used, it can be a preprocess-only fuzzer which may be used with an associated postprocess fuzzer. A template set can be predefined from a predefined template set, copied from another run specification, or a public directory path may be specified. If the public directory path is specified, files from that directory can be copied to the appropriate file store and used for an associated run. A standard run may be specified by default. Standard runs can be defined once and run once. There is also the option of a general run. A general run can be defined once and can run multiple times as they are automatically generated. Other options are available.

As described above, a user can predefine fuzzers and templates on the server 102 that are to be used for multiple runs. A template file can be used to generate fuzzed files. In one embodiment, a fuzzer can be created using the contents of a local file directory (e.g., a local file fuzzer directory). For example, a pre-defined fuzzer may include a particular file fuzzer or a preprocess-only fuzzer. For preprocess only, an executable can be defined as well as command line arguments (including tokens relating to the storage locations of template files, fuzzed files, number of iterations, etc.) and a postprocess fuzzer can also be pre-defined.

Once defined, the run and other fuzzing parameters can be communicated to the web server 104. At 402, the web server 104 defines the run on the server 102 using the run parameters. For example, the run can be defined as part of a runs table associated with the server 102. At 404, the team contact can add any associated files (e.g., fuzzers, templates, etc.) to the file store 106. Once the appropriate files have been added to the file store 106, at 406 the run is placed in queue for execution.

In one embodiment, runs are queued in the order that they are created, and standard runs are prioritized over runs created from general runs. Moreover, general runs are not put directly in the run queue. The server will automatically create a standard run based on the general run as needed. A need can be defined when there is no active instance of a general run in the queue. Clients can consider all runs in tire queue viable to be run and will filter the queue to a prioritized list based on the group or team, available applications, build numbers of these applications, etc. A client can also operate to bypass the queue using a number of advanced options (e.g., force to application, force to specific run).

In another embodiment, runs are queued as long as the number of flies that have been postprocessed is less than the number of iterations to be completed and/or there are fewer failures than the maximum number of defined failures. A run having an expiration date can be automatically removed from the queue once the date passes. If a maximum number of computing devices are defined for a run, the run will be hidden when the maximum number of computing devices are actively processing for the run.

Phase 2 of FIG. 4 Illustrates the contribution of a resource to a file fuzzing run. As part of defining a run, a team contact or other user can define users that will be allowed to contribute resources to complete fuzzing work. At 408, a team member boots a client associated with a computing device that may be used in a fuzzing operation. At 410, the client registers with the server 102. At 412, if a previous fuzzing configuration exists, the server 102 operates to return the data associated with the previous configuration. At 414, the client can operate to build an application footprint for subsequent use. In one embodiment, an application footprint can be built by obtaining a list of applications used by a specified team and any registry keys or paths to the application locations.

At 416, a team member can use an associated client to initiate a fuzzing operation (e.g., opts-in to "Start Fuzzing"). At 418, the associated information is registered with the server 102 and available resources are provided to the server 102 by the client. At 420, the server 102 returns the run details that need completing. At 422, the client can retrieve any files (e.g., fuzzers, templates, etc.) associated with the run from the file store 106. The files are communicated from the file store 106 at 424 and can be stored locally (e.g., RAM) on the computing device associated with the client. In another embodiment, the files can be stored on a different computing device or file store for access by a particular client.

At 426, the client uses a file fuzzer associated with the fuzzing run to complete a specified file fuzzing task. When the fuzzing is complete, at 428 the client operates to log run information including any failures to the server 102. In one embodiment, successfully postprocessed (e.g., no Access Violation (AV), other failure found, etc.) files are tallied and then discarded. Unpostprocessed files refer to files not opened by the fuzzer which can be logged in a list of unpostprocessed files and stored on the associated file store.

Failed files can be logged in a list with details including the associated computing device where the failure occurred. In one embodiment, the logging details can include: user identification details; name of computing device; application version number; time of failure; and, the complete XML of the failure from the file fuzzer log. At 430, the client can store any files to the file store 106, including any failed files if they are seen as important or of value. Bug IDs can also be assigned to failures for easier tracking. If the client has not been stopped after storing any results, including failed files, the client can "Start Fuzzing" again at 416.

Phase 3 of FIG. 4 illustrates an investigation of a file fuzzing run. Once a run has completed or otherwise stopped or aborted, a team contact can be notified and/or the run can be moved from the queue to a list of uninvestigated runs. Thereafter, at 432, a team contact or other user may investigate the results of a fuzzing run at some desired time. In one embodiment, the server 102 can scan the results of a run and automatically attempt to identify any issues. At 434, the team contact can request result details from the web server 104. At 436, the web server 104 operates to compile results for the associated fuzzing run from the server 102. At 438, the web server 104 returns the rendered results to the team contact for use in an associated investigation.

Figure 5:
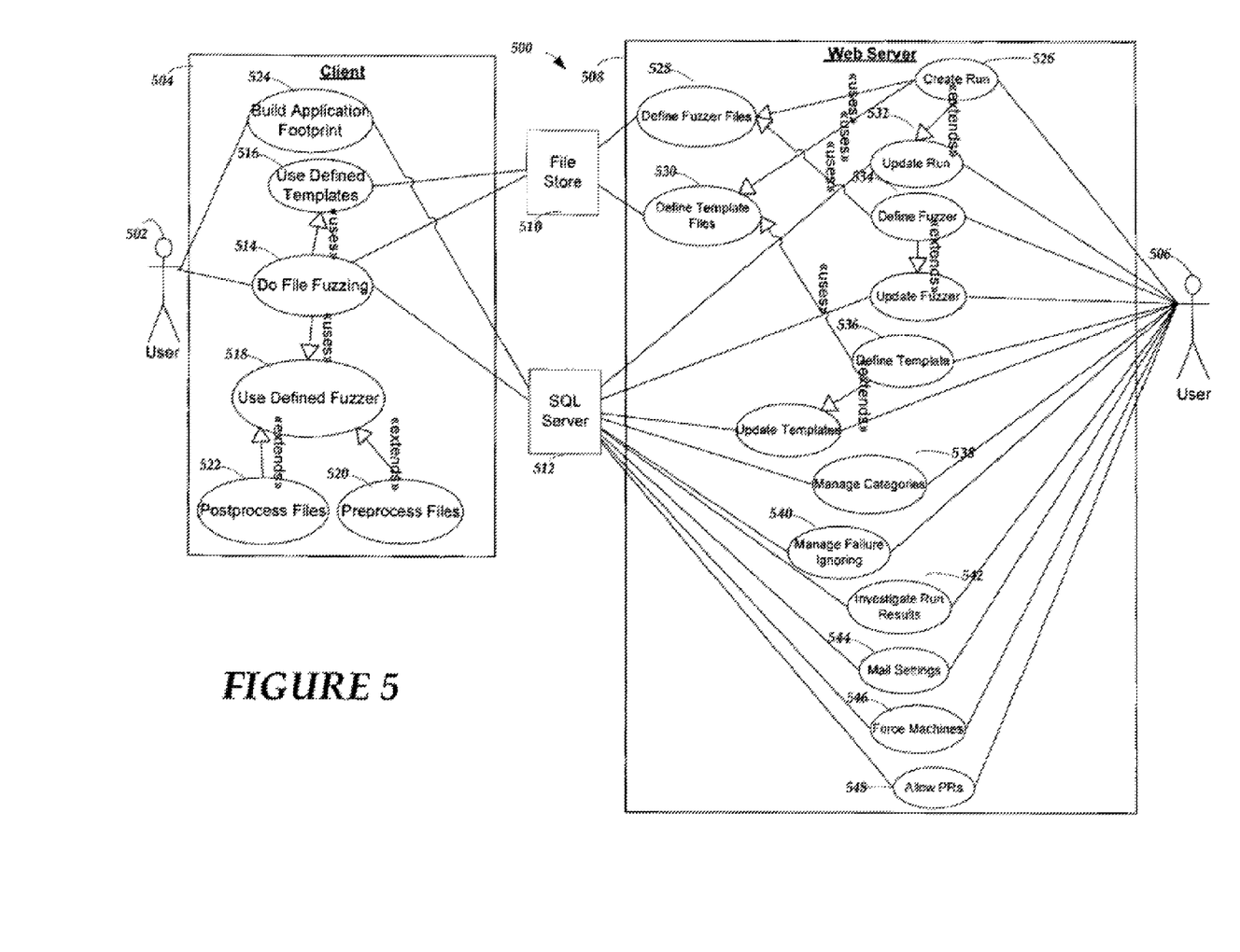
FIG. 5 is a diagram depicting a distributed file fuzzing use case.

FIG. 5 is a diagram depicting a distributed file fuzzing use case, under an embodiment. As shown in FIG. 5, an interactive environment 500 enables interaction by a first user 502 using a client 504 and a second user 506 communicating through a web server 508 to interact with a file store 510 and a SQL Server 512. For example, there may be a number of team members, clients, and associated computing devices used for distributed fuzzing operations. There may also be a number of team contacts, clients, and associated computing devices corresponding to people who create fuzzing work for a group, team, etc.

FIG. 5 illustrates a number of relationships between tasks, components, and end-users. For example, for user 502 can do file fuzzing at 514 using a number of defined templates at 516 and a defined fuzzer at 518 which can be retrieved for a run from the file store 510. Using the defined fuzzer at 518 can also include preprocessing at 520 and postprocessing at 522 of files using a retrieved or otherwise communicated fuzzer or fuzzers. File fuzzing results from the fuzzing work can be communicated to the SQL server 512 and, where necessary, failures can be communicated to the file store 510 for subsequent processing, investigation, etc. The client 504 can be used to build an application footprint 524 of an associated computing device. When building an application footprint 524, the client 504 uses the SQL server 512 to provide details about the applications that need to be available on the associated computing device for use in fuzzing.

A user 506, such as a group or team contact for example can perform a variety of tasks using the system 500. The user 506 can create a run at 526 including defining a fuzzer and associated files 528, and one or more templates 530. The fuzzer, fuzzer files, and templates can be stored on the file store 510. In one embodiment, a run can be created through the same mechanism that is used to update runs at 532. Correspondingly, fuzzers and template files can be defined for reuse across multiple runs at 534 and 536. The files can be stored on the file store 510 and any associated definitions can be defined on the SQL server 512. The user 506 can also perform various tasks including, but not limited to: managing categories for runs at 538; managing failure ignoring at 540; investigating run results at 542; setting up mail settings for run completion at 544; forcing computers to do specific work at 546; and, allowing specific private releases to be used in the system 500 at 548. Other use cases and operations are available.

Figure 6:
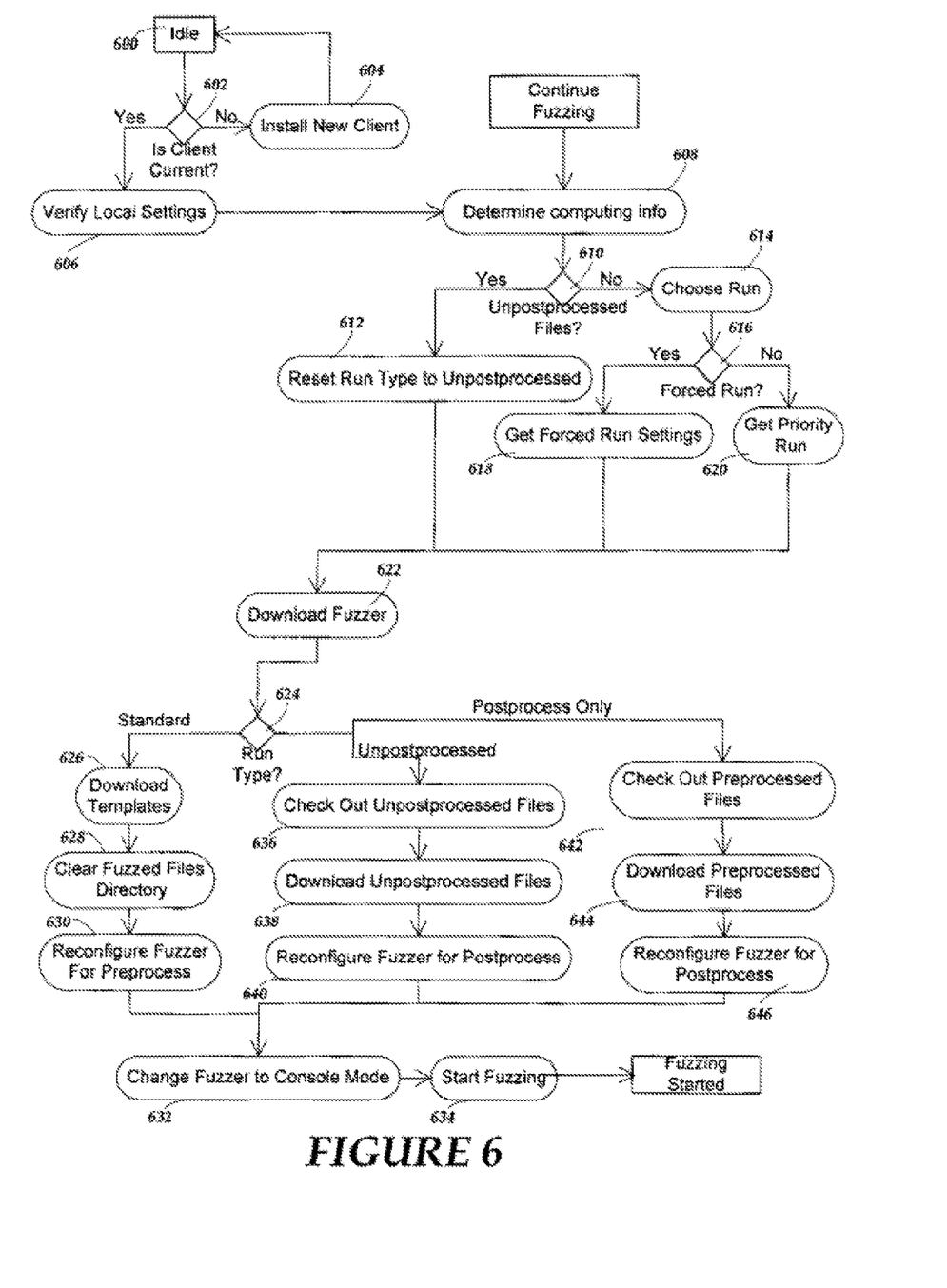
FIG. 6 is a flow diagram illustrating a distributed file fuzzing process.

FIG. 6 is a flow diagram illustrating a distributed file fuzzing process, under an embodiment. Again, the components of FIG. 1 are used in the description of FIGS. 6-9, but the embodiments are not intended to be so limited. For example, the computing environments of FIGS. 2-3 and other computing environments can be used for the processes depicted in FIGS. 6-9. As shown in FIG. 6, a fuzzing process is described which includes a client executing on a computing device as part of a distributed fuzzing environment.

At 600, the client is shown in an idle state, which occurs after a user offers the respective computing device as a fuzzing resource. In one embodiment, the client can be configured with a number of default settings. As described below, the client can be configured to perform fuzzing work in chunks or parts, returning any resultant data to the server 102 and subsequently used again for other fuzzing work. During the idle state, a user (such as a team contact for example) may define fuzzing work to be executed on the computing device that is associated with a particular team or group. The process of FIG. 6 presumes that a user has opted-in to the fuzzing environment, thereby providing at least one associated computing device for use in distributed fuzzing operations.

At 602, the client queries the server 102 to determine if the client is current and includes the most up-to-date capabilities. If the client is not current, at 604 a new version can be downloaded from she server 102 and installed locally to the associated computing device. If the client is current, at 606 a number of local settings are verified to ensure that the associated computing device is property configured. In one embodiment, the verification can include: verifying that a team has been selected; verifying that there is a connection to the server 102; resetting counters; calculating an amount of time to run (e.g., if a timeout is set by the hours to run for field); etc. In an alternate embodiment, the client can also be configured to determine an application footprint that is associated with the computing device. The client can determine the application footprint by determining which applications are currently installed on the associated computing device.

Alter verifying the local settings, at 608 the client can determine other operational information associated with the computing device. For example, the client can determine the processing speed, efficiency, available bandwidth, available memory, projected availability, validation credentials, identification information, etc. of an associated computing device. The client can communicate the information associated with the computing device to the server 102 for use in distributing fuzzing operations. Correspondingly, a computing device can be optimally utilized in the system 100 for particular fuzzing operations by determining an application footprint and/or other operational information.

At 610, the client queries the server 102 to determine if there are any unpostprocessed files associated with a particular fuzzing task. Unpostprocessed files may be associated with incomplete fuzzing operations that a client has returned to the server 102 for storage in the file store 106. Unpostprocessed files can be picked up and completed at some desired time. If there is an unpostprocessed file at 610, the client resets the current run type to unpostprocessed at 612. Otherwise, the client informs the server 102 that it intends to select a fuzzing run at 614.

At 616, the client determines if it has been forced to perform a specific fuzzing run. Forced settings may include specific products, teams, runs, and actions like stop and wait for example. For example, a team contact may specify a particular fuzzing run for an associated computing device, thereby forcing the computing device to execute the fuzzing run. If forced settings exist, at 618 the client obtains the forced settings from the server 102 for use in the fuzzing run. If the client is not being forced to perform a specific fuzzing run, at 620 the client prepares to run a prioritized fuzzing run as defined on the server 102.

The server 102 is configured to locate the appropriate fuzzer for the associated fuzzing run. For example, the server 102 can locate the appropriate fuzzer which may reside in a central file store, local file store, or some other file store (e.g., some web location). At 622, the client downloads the appropriate fuzzer for the current fuzzing run from a location as determined by the server 102, unless the fuzzer is already included with the computing device which can be determined from the application footprint. In another embodiment, the server 102 can automatically push the appropriate fuzzer to the computing device based on the type of fuzzing run.

At 624, the flow proceeds based on run type. If the run type is the standard run type, at 626 a number of standard templates can be downloaded from the file store 106. At 628, the client can clean out a local fuzzed files directory. At 630, the client reconfigures the appropriate fuzzer in preparing to preprocess any associated files. In one embodiment, reconfiguration can be tailored according to the fuzzer being used. For a general case, the following can be reconfigured in the fuzzer to reflect the configuration of an associated computing device; path to template files; path to fuzzed files; path to fuzzer log; path to crashed files; program to start; type of fuzzing to be done; number of iterations; timeout (until the application process is killed); extension mask, etc.

During preprocessing, a specified file fuzzer can be called to generate files. Once the files have been generated, the files are inventoried and the client can notify the server 102 of the generated files. Preprocessing may be associated with a fuzzing task previously defined by a team member, but has not yet run. At 632, the client changes the fuzzer mode to a console mode and can begin fuzzing at 634. In one embodiment, a plugins.xml file can modified to switch the fuzzer from GUI to console mode.

In an embodiment, before fuzzing, the client can operate to perform a number of pre-start verification operations. The pre-start verification operations can include group or team verification, connection verification, location verification, application footprint building, and/or verifying UI settings. As described above, the application footprint can include a list of applications available on an associated computing device that can assist in filtering run settings and with other managing functionality.

If the run type is impost processed at 624, the flow proceeds to 636 and the client checks out any unpostprocessed files from the server 102. An unpostprocessed file may refer to a preprocessed file that may have failed for some reason during a previous run. In one embodiment, during check-out, the client queries the server 102 for available files to run, and the server 102 marks the files so that no other client picks up the same file or files. At 638, the client downloads the unpostprocessed files from the file store 106. At 640, the client reconfigures the fuzzer for postprocessing operations. In one embodiment, changes can be made to the schema associated with a fuzzer to implement a reconfiguration. The flow then proceeds to 632 and the client changes the fuzzer mode to a console mode and can begin fuzzing at 634.

If the run type is postprocess only at 624, the flow proceeds to 642 and the client checks out any preprocessed files from the server 162. Postprocess only refers to a state where files have been preprocessed (i.e., fuzzed), but have not been postprocessed (i.e., opened in an application under test). For example, a sequential fuzzer operates on a file in some order rather than randomly. Accordingly, files may be pre-generated and the preprocessing refers to the fuzzing of one or more files. Postprocessing refers to the process of opening one or more preprocessed files and debugging an associated application as needed to locate potential failures or other information. For example, a preprocessed file can be opened in a target application (as specified in the runs definition) and any problems or other issues can be ascertained. At 644, the client downloads one or more preprocessed files from the file store 106. At 646, the client reconfigures the fuzzer for postprocessing operations. The flow then proceeds to 632 and the client changes the fuzzer mode to a console mode and can begin fuzzing at 634.

Figure 7:
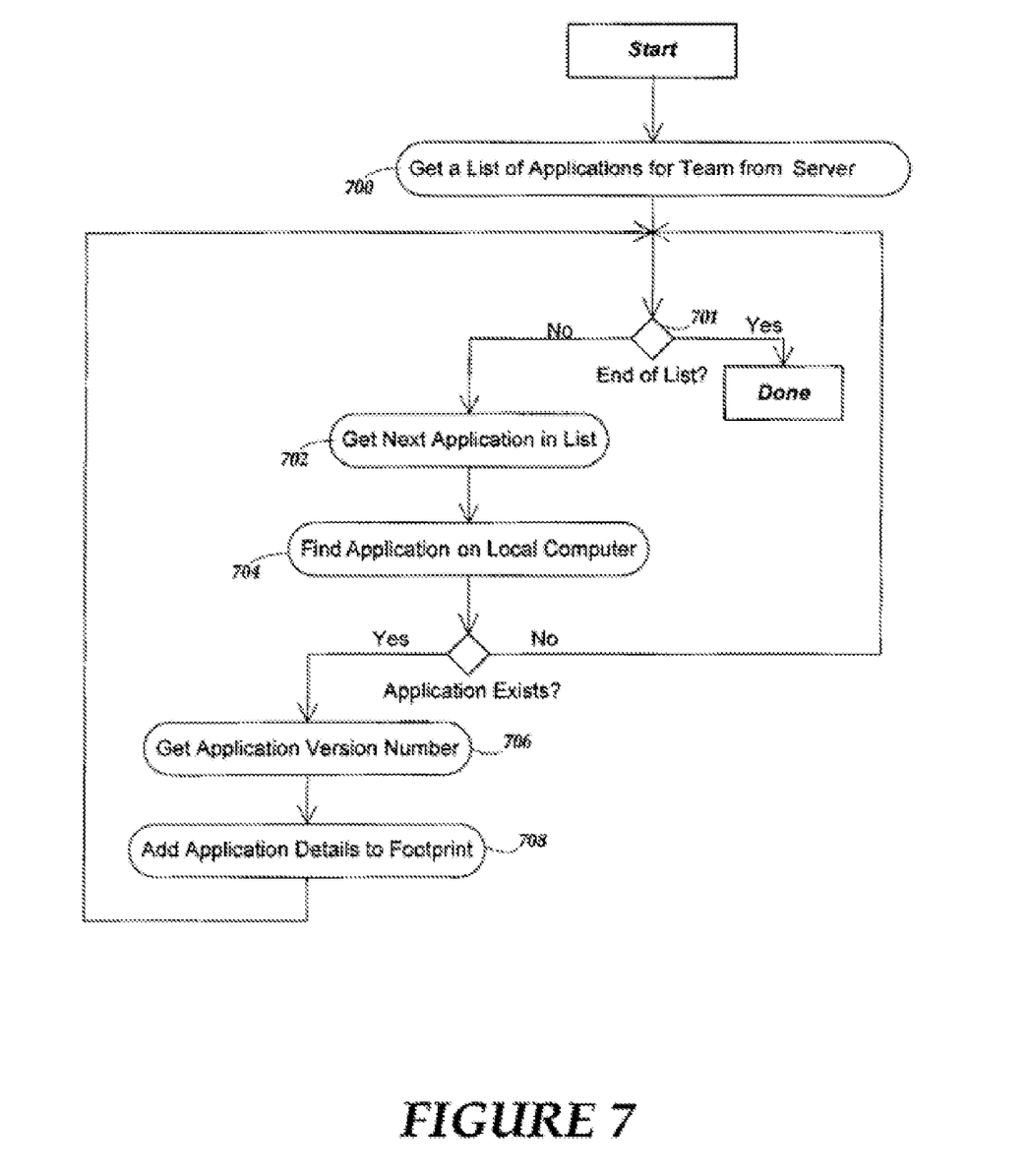
FIG. 7 is a flow diagram illustrating a footprint build process.

FIG. 7 is a flow diagram illustrating a footprint build process by a client, under an embodiment. At 700, the client retrieves a list of applications for an associated team or group from the server 102. If the client reaches the end of the application list at 701, the application footprint has been built and the flow ends. Otherwise the flow continues to 702. At 702, the client retrieves the next application in the list to footprint. At 704, the client looks for the application on the local computer. If the application is not on the local computer, the flow returns to 701. If the application is on the local computer, at 706 the client obtains a version number associated with the application. At 708, the client adds details associated with the application to the footprint associated with the local computer and the flow returns to 701.

Figure 8:
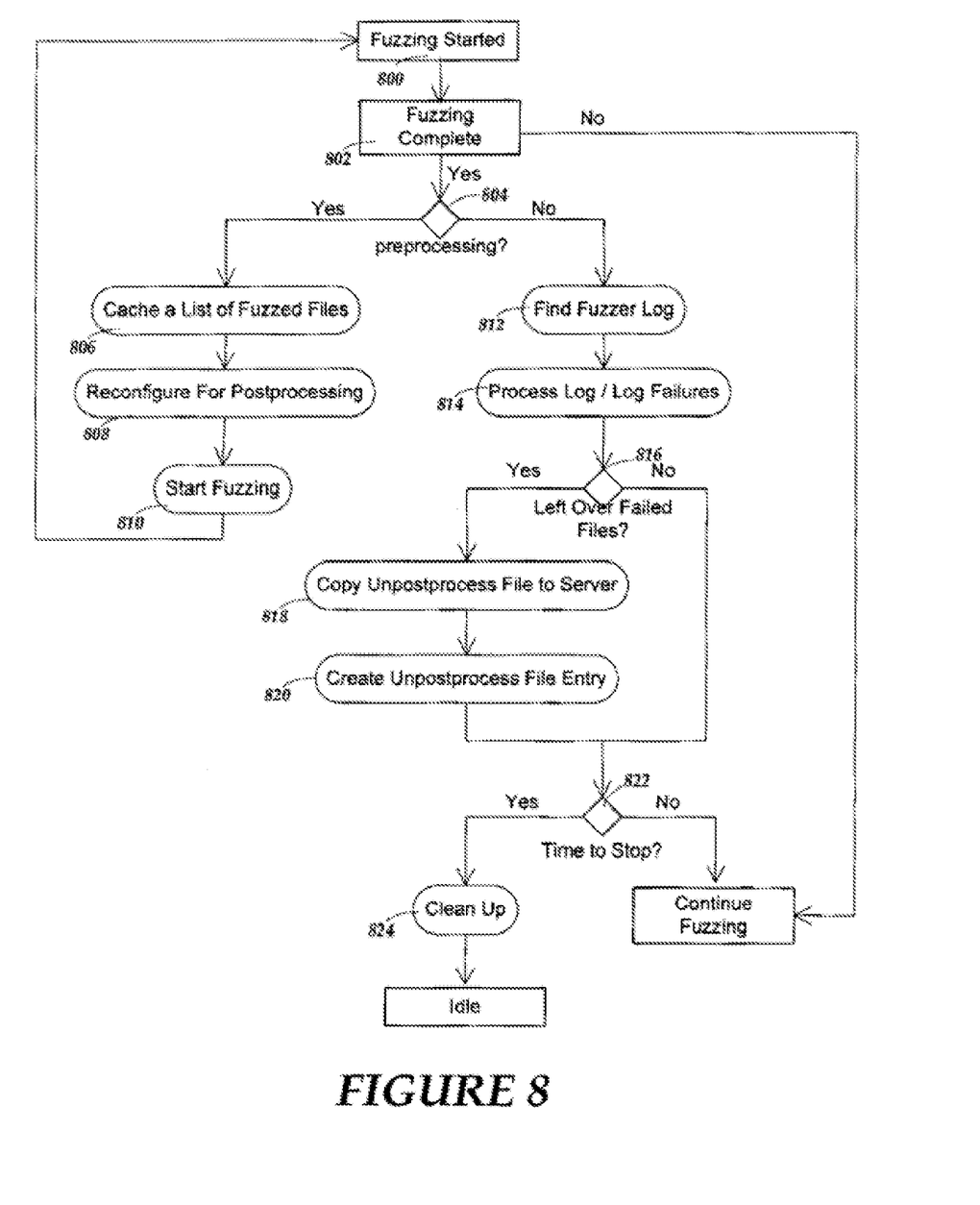
FIG. 8 is a flow diagram illustrating a distributed file fuzzing process.

FIG. 8 is a flow diagram illustrating a distributed file fuzzing process, under an embodiment. At 800, a fuzzing operation has started. As described herein, a number of computing devices can contribute to a fuzzing operation. For example, a team may have five available computers to contribute to fuzzing work, and each computer can be delegated to a particular fuzzing task associated with the fuzzing work. FIG. 8 is described from the perspective of a client executing on a computing device, such as a laptop, desktop, handheld, etc.

At 802, the client determines if an associated fuzzing operation is complete. If the fuzzing operation is complete, the flow proceeds to 804 and the client determines if the fuzzer was performing preprocessing operations. If the fuzzer was preprocessing, the flow proceeds to 806 and the client operates to cache a list of fuzzed files. At 808, the client reconfigures the fuzzer for postprocessing operations. At 810, the client starts any postprocessing fuzzing and the flow returns to 800.

If the fuzzer was not performing preprocessing operations at 804, the flow proceeds to 812 and client locates the fuzzer log on the local computing device. Each fuzzer can operate to create a log of work performed, any failures, and other information associated with a fuzzing process. At 814, the client operates to process the fuzzer log <(e.g., an xml file) including logging any failures which occurred during fuzzing on the server 102.

At 816, the client determines if there are saw remaining failed files. If there is a remaining failed file at 816, the client operates to copy the unpostprocess file to the server 102 at 818. At 820, the client creates an unpostprocess file catty entry for the associated unpostprocess file on the server 102. The flow proceeds to 822 and the client determines if it is time to stop fuzzing operations. If so, at 824 the client cleans up files stored on the computing device associated with the fuzzing operations. For example, the client can clean up the files that were stored including the fuzzer, templates, and generated files. Otherwise, the client continues fuzzing operations.

Figure 9:
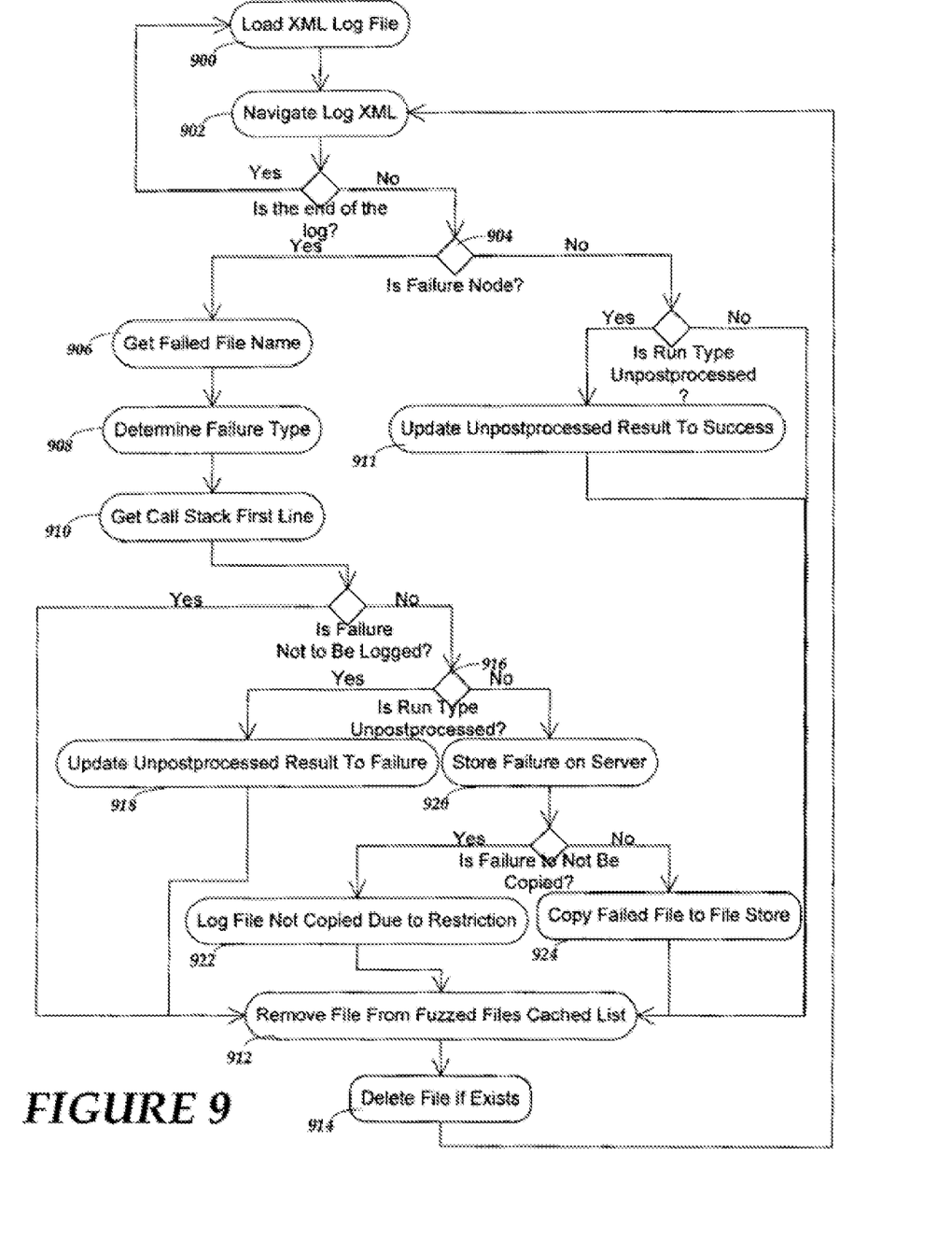
FIG. 9 is a flow diagram illustrating the processing of a fuzzing log.

FIG. 9 is a flow diagram illustrating the processing of a fuzzing log, under an embodiment. At 900, a client loads an xml log file. At 902, the client navigates the log file. If the client reaches the end of the log file, the flow returns to 900, and the client can load another log file if desirable. Otherwise, the flow proceeds to 904, and the client determines whether the log file contains a failure node.

If there is a failure node, the flow proceeds to 906 and the client determines the file name of the failed file that is associated with the failure node. At 908, the client determines the failure type term the log file. At 910, the client retrieves the first line of the call stack from the log file. If there is no failure node at 904, and if the run type is not unpostprocessed, the flow proceeds to 912 and the client removes the file from the fuzzed files cache list. Otherwise, the flow proceeds to 911 and the client updates the unpostprocessed result to a success and the flow continues to 912 and the client removes the file from the fuzzed files cached list.

Likewise, if a failure is not going to be logged, the flow continues to 912 and the client removes the file from the fuzzed files cached list. At 914, the client then deletes the associated file if it exists. If the failure is going to be logged, the flow proceeds to 916, and the client determines if the run type was unpostprocessed. If the run type was unpostprocessed, the client updates the unpostprocessed run result as a failure at 918. The flow proceeds to 912 and the client removes the unpostprocessed file from the fuzzed files cached list. At 914, the client then deletes the associated unpostprocessed file if it exists.

If the run type was not unpostprocessed, the client stores the failure to the server 102 at 920. If the failure is not going to be copied, the flow proceeds to 922 and the log file is not copied due to a restriction. The flow again proceeds to 912 and the client removes the file from the fuzzed files cached list. At 914, the client then deletes the associated file if it exists. If the failure is going to be copied, the flow proceeds to 924 and the client copies the failed file to the file store 106. The flow then proceeds to 912 and the client removes the file from the fuzzed files cached list. At 914, the client then deletes the associated file if it exists. The client can also operate to notify the server 102 with counts of successful, unsuccessful and failed files. Other information can also be communicated to server 102 such as the computing device associated with the failure, the current user, the build of the application, the complete failure log in XML, etc.

As described herein, a distributed file fuzzing system is configured to manage aspects of file fuzzing, including, but not limited to: managing a number of file fuzzers; managing associated tasks; distributing fuzzing work to a number of computing devices; and collecting and storing fuzzing results to a central or other repository for further investigation. The distributed file fuzzing system allows fuzzing work to be distributed to groups, teams, or other associations for completion. Accordingly, a group, team, individual, etc. can contribute to an associated fuzzing task or multiple groups may contribute to one or more fuzzing tasks according to a desired fuzzing implementation. Correspondingly, a select number of computing devices can contribute to file fuzzing operations. For example, it could take one computer as much as five days to complete 100,000 iterations. Whereas a distributed file fuzzing system using 10 computers can be configured to complete the same fuzzing work in 12 hours, and require neither manual tabulation of results nor any manual setup of the 10 computers.

In art embodiment, the distributed file fuzzing system can use a client-server relationship to distribute, manage, and otherwise control fuzzing work. A client provides a mechanism for users to interact with the system and enroll a respective computing device for fuzzing work. The client is also configured to control fuzzing tasks on an associated computing device, including managing a file fuzzer and files generated during fuzzing. The server can provide details on work that needs to be complete in the form of run specifications or parameters. The details provided by the server can include how fuzzing should be done, what file fuzzer to use for fuzzing, fuzzing configuration, products to test against, the files to use to generate fuzzed files, and other fuzzing details. The server can receive result data from each client, including details of complete and incomplete work. The server can also be configured to provide a web interface to manage clients, run specifications, and other information.

While a certain order and relation is shown in FIGS. 4-9, other implementations are available. Also, while the system 100 is shown to include a number of components, it can include fewer or more components according to a desired functionality or implementation. For example, the functionalities of the server 102 and web server 104 may be combined and provided by a single system. The system 100 can be implemented as part of networked, distributed, or other computer-implemented environment. The system 100 and its components can communicate via a wired, wireless, and/or a combination of communication networks. A number of client computing devices, including desktop computers, laptops, handhelds, or other smart devices can interact with and/or be included as part of the system 100. The system 100 can also include multiple clients and is not limited to any particular configuration, wherein each client can include various functionality and other components.

Exemplary Operating Environment

Figure 10:
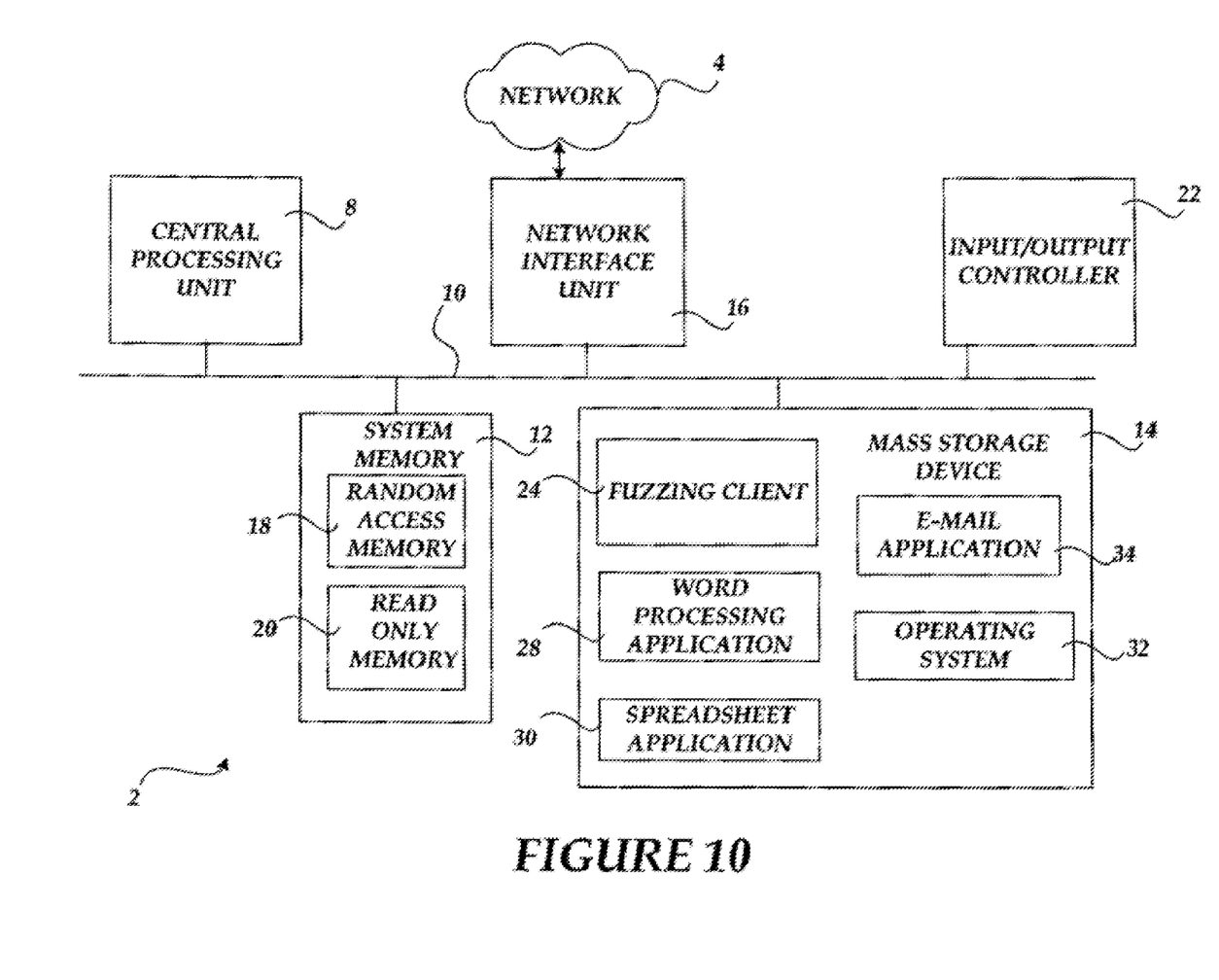
FIG. 10 is a block diagram illustrating a computing environment for implementation of various embodiments described herein.

Referring now to FIG. 10, the following discussion is intended to provide a brief, general description of a suitable computing environment in which embodiments of the invention may be implemented. While the invention will be described in the general context of program modules that execute in conjunction with program modules that run on an operating system on a personal computer, those skilled in the art will recognize that the invention may also be implemented in combination with other types of computer systems and program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor, systems, microprocessor-based or programmable consumer electronics, minicomputers, mainframe computers, and the like. The invention may also be practiced in distributed computing environments where tasks are perforated by remote processing devices that are linked through a communications network. In a distributed computing environment, program modules may be located in both local and remote memory storage devices.

Referring now to FIG. 10, an illustrative operating environment for embodiments of the invention will be described. As shown in FIG. 10, computer 2 comprises a general purpose desktop, laptop, handheld, tablet, or other type of computer capable of executing one or more application programs. The computer 2 includes at least one central processing unit 8 ("CPU"), a system memory 12, including a random access memory 18 ("RAM") and a read-only memory ("ROM") 20, and a system bus 10 that couples the memory to the CPU 8. A basic input/output system containing the basic routines that help to transfer information between elements within the computer, such as during startup, is stored in the ROM 20.

The computer 2 further includes a mass storage device 14 for storing an operating system 32, application programs, such as a fuzzing client 24, and other program modules. The mass storage device 14 is connected to the CPU 8 through a mass storage controller (not shown) connected to the bus 10.

The mass storage device 14 and its associated computer-readable media provide non-volatile storage for the computer 2. Although the description of computer-readable media contained herein refers to a mass storage device, such as a hard disk or CD-ROM drive, it should be appreciated by those skilled in the art that computer-readable media can be any available media that can be accessed or utilized by the computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CO-ROM, digital versatile disks ("DVD") or other optical storage, magnetic cassettes, magnetic tape, magnetic disk storage or other magnetic storage devices, or any other medium which can be used to store the desired information and which can be accessed by the computer 2.

According to various embodiments of the invention, the computer 2 may operate in a networked environment using logical connections to remote computers through a network 4, such as a local network, the Internet, etc. for example. The computer 2 may connect to the network 4 through a network interface unit 16 connected to the bus 10. It should be appreciated that the network interface unit 10 may also be utilized to connect to other types of networks and remote computing systems. The computer 2 may also include an input/output controller 22 for receiving and processing input from a number of input types, including a keyboard, mouse, pen, stylus, finger, and/or other means. Similarly, an input/output controller 22 may provide output to a display, a printer, or other type of output device. Additionally, a touch screen can serve as an input and an output mechanism.

As mentioned briefly above, a number of program modules and data files may be stored in the mass storage device 14 and RAM 18 of the computer 2, including an operating system 32 suitable for controlling the operation of a networked personal computer, such as the WINDOWS operating systems from MICROSOFT CORPORATION of Redmond, Wash. The mass storage device 14 and RAM 18 may also store one or more program modules. In particular, the mass storage device 14 and the RAM 18 may store application programs, such as a word processing application 28, a spreadsheet application 30, e-mail application 34, drawing application, etc.

It should be appreciated that various embodiments of the present invention can be implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, logical operations including related algorithms can be referred to variously as operations, structural devices, acts or modules. It will be recognized by one skilled in the art that these operations, structural devices, acts and modules may be implemented in software, firmware, special purpose digital logic, and any combination thereof without deviating from the spirit and scope of the present invention as recited within the claims set forth herein.

Although the invention has been described in connection with various exemplary embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow.

What is claimed is:

1. A computer-readable medium storing executable instructions which, when executed, manage file fuzzing by:
    associating a group of computing devices with a fuzzing task, wherein the fuzzing task includes a number of fuzzing operations;
    distributing the number of fuzzing operations to a plurality of computing devices of the group, wherein each computing device of the plurality is to perform at least one of the number of fuzzing operations as part of contributing to distributed fuzzing operations of the fuzzing task;
    determining an appropriate fuzzer for each computing device of the plurality based in part on characteristics of a corresponding computing device;
    determining appropriate fuzzer files for the plurality of computing devices based in part on appropriate fuzzers and corresponding fuzzing operations to be executed by the plurality of computing devices;
    executing the fuzzing operations using the plurality of computing devices to provide an output of fuzzing information as part of the distributed fuzzing operations;
    receiving the output of fuzzing information associated with execution of the number of fuzzing operations using the plurality of computing devices; and,
    storing the output of fuzzing information associated with the fuzzing task.

2. The computer-readable medium of claim 1, wherein the instructions, when executed, manage file fuzzing by defining fuzzing work associated with the fuzzing task and storing the defined fuzzing work on a server for access by the plurality of computing devices, the fuzzing work assigned to each computing device of the plurality based in part on an application footprint and operational characteristics of each computing device, the application footprint defined in part by applications required for fuzzing operations of the fuzzing task.

3. The computer-readable medium of claim 2, wherein the instructions, when executed, manage file fuzzing by receiving parameters associated with an application footprint of each of the plurality of computing devices, and distributing the fuzzing operations to each of the plurality of computing devices based in part on the application footprint parameters determined as part of a pre-start verification operation.

4. The computer-readable medium of claim 1, wherein the instructions, when executed, manage file fuzzing by storing a failed file associated with the fuzzing task.

5. The computer-readable medium of claim 1, wherein the instructions, when executed, manage file fuzzing by receiving information associated with a configuration of each of the plurality of computing devices, and distributing the fuzzing task based in part on the configuration of each of the computing devices.

6. The computer-readable medium of claim 1, wherein the instructions, when executed, manage file fuzzing by distributing the fuzzing operations based in part on available resources associated with the plurality of computing devices.

7. The computer-readable medium of claim 1, wherein the instructions, when executed, manage file fuzzing by receiving a number of run parameters associated with the fuzzing task and using the number of run parameters to locate a fuzzer for each computing device of the plurality based in part on the number of run parameters.

8. The computer-readable medium of claim 1, wherein the instructions, when executed, manage file fuzzing by logging a failure associated with the fuzzing task.

9. The computer-readable medium of claim 8, wherein the instructions, when executed, manage file fuzzing by investigating the failure.

10. The computer-readable medium of claim 1, wherein the instructions, when executed, manage file fuzzing by determining the appropriate fuzzer for each computing device of the plurality according to the fuzzing task, identifying the appropriate fuzzer, downloading the appropriate fuzzer and using the appropriate fuzzer as part of one of a standard fuzzing operation, unpostprocessed fuzzing operation, and postprocess only fuzzing operation.

11. The computer-readable medium of claim 10, wherein the instructions, when executed, manage file fuzzing by receiving postprocessing information associated with a postprocess fuzzing operation that includes reconfiguring the appropriate fuzzer to postprocess a preprocessed file that failed during a previous run.

12. The computer-readable medium of claim 11, wherein the instructions, when executed, manage file fuzzing by receiving preprocessing information associated with a preprocess fuzzing operation as part of reconfiguring an appropriate fuzzer for a preprocess fuzzing operation.

13. A system to manage fuzzing operations as part of providing a distributed fuzzing environment, the system comprising:
- a plurality of computing devices wherein each computing device of the plurality is to perform at least one fuzzing operation as part of contributing to distributed fuzzing operations of a fuzzing run;
- a serving component in communication with the plurality of computing devices to manage a distribution of the fuzzing operations to the plurality of computing devices associated with the fuzzing run, wherein the serving component includes functionality to:
  - identify a fuzzer associated with the fuzzing operations including determining an appropriate fuzzer for each computing device of the plurality based in part on characteristics of a corresponding computing device;
  - determine appropriate fuzzer files for the plurality of computing devices based in part on appropriate fuzzers and corresponding fuzzing operations for execution by the plurality of computing devices;
- a client component associated with each computing device of the plurality to define run parameters associated with the fuzzing run, wherein the client component is configured to determine an application footprint of an associated computing device; and,
- a store component including memory to store fuzzing information associated with the distribution of the fuzzing operations.

14. The system of claim 13, wherein each client component is further configured to use a fuzzer to provide fuzzing results to the store component.

15. The system of claim 13, wherein the serving component is further configured to maintain a queue of fuzzing runs, wherein the queue can include a forced run, a standard run, or both.

16. A method of file fuzzing comprising:
- collecting information associated with a group of computing devices to be used in the file fuzzing, wherein the collected information includes operational capability of each computing device of the group of computing devices, wherein each computing device of the group is to perform at least one fuzzing operation as part of contributing to distributed file fuzzing operations;
- receiving an indication of a fuzzer to use for the file fuzzing including determining an appropriate fuzzer for each computing device of the group based in part on characteristics of a corresponding computing device;
- receiving a fuzzing file associated with the file fuzzer including determining appropriate fuzzer files for the group of computing devices based in part on appropriate fuzzers and corresponding fuzzing operations to be executed by the group;
- executing the fuzzing operations using the group of computing devices to provide an output of fuzzing results as part of distributed file fuzzing;
- compiling the fuzzing results associated with the group of computing devices; and,
- storing the fuzzing results.

17. The method of claim 16, further comprising distributing fuzzing tasks to the group of computing devices based in part on an operational configuration of each computing device.

18. The method of claim 17, further comprising distributing fuzzing tasks to the group of computing devices after determining an application footprint of each computing device of the group of computing devices including distributing the fuzzing operations to each computing device based in part on application footprint parameters that are determined as part of pre-start verification operations.

19. The method of claim 16, further comprising creating a fuzzing run by defining a fuzzing group, iterations to complete, and an associated number of failures.

20. The method of claim 16, further comprising logging a failure associated with a fuzzing task.

* * * * *